US009975661B2

United States Patent
Bagley

(10) Patent No.: US 9,975,661 B2
(45) Date of Patent: May 22, 2018

(54) COLLAPSIBLE PRODUCE KEEPER

(71) Applicant: Progressive International Corporation, Kent, WA (US)

(72) Inventor: Justin Bagley, Seattle, WA (US)

(73) Assignee: PROGRESSIVE INTERNATIONAL CORPORATION, Kent, WA (US)

(*) Notice: Subject to any disclaimer, the term of this patent is extended or adjusted under 35 U.S.C. 154(b) by 436 days.

(21) Appl. No.: 14/613,873

(22) Filed: Feb. 4, 2015

(65) Prior Publication Data

US 2015/0217901 A1 Aug. 6, 2015

Related U.S. Application Data

(60) Provisional application No. 61/935,745, filed on Feb. 4, 2014.

(51) Int. Cl.
| | |
|---|---|
| *B65D 21/00* | (2006.01) |
| *B65D 21/08* | (2006.01) |
| *A47J 47/08* | (2006.01) |
| *B65D 43/02* | (2006.01) |
| *B65D 85/50* | (2006.01) |

(52) U.S. Cl.
CPC ........... *B65D 21/086* (2013.01); *A47J 47/08* (2013.01); *B65D 43/0208* (2013.01); *B65D 85/50* (2013.01); *B65D 2543/00194* (2013.01); *B65D 2543/00296* (2013.01)

(58) Field of Classification Search
CPC .. B65D 21/086; B65D 85/50; B65D 43/0028; B65D 2543/00296; B65D 2543/00194; B65D 21/068; A47J 47/08; A47J 47/10

USPC .............................................. 220/8, 571, 570
See application file for complete search history.

(56) References Cited

U.S. PATENT DOCUMENTS

| | | | | |
|---|---|---|---|---|
| 313,538 | A * | 3/1885 | Schneider | B65D 21/086 220/8 |
| 685,736 | A * | 10/1901 | Atwell | B65D 21/086 206/550 |
| 848,698 | A * | 4/1907 | Smith | B65D 21/083 220/4.03 |
| 888,554 | A * | 5/1908 | Tuttle | B65D 21/086 206/546 |
| 888,943 | A * | 5/1908 | Tuttle | B65D 21/086 206/546 |
| 1,863,793 | A * | 6/1932 | Hermani | A47G 19/26 220/324 |
| 3,301,457 | A * | 1/1967 | Millian | B65D 21/086 220/266 |
| 3,329,298 | A * | 7/1967 | Demas | B65D 21/086 220/8 |
| 3,578,415 | A * | 5/1971 | Hiltz | B01J 7/00 220/739 |
| 4,624,382 | A * | 11/1986 | Tontarelli | A45C 5/045 220/751 |

(Continued)

*Primary Examiner* — Ernesto Grano
(74) *Attorney, Agent, or Firm* — Lowe Graham Jones PLLC

(57) ABSTRACT

A collapsible produce keeper is selectively positionable between an expanded position and a collapsed position, in which the produce keeper may be used to contain produce in both positions. In one version, an upper container portion is telescopically connected to a lower container portion, with a lid removably attached to the upper container and a base removably attached to the lower container.

15 Claims, 9 Drawing Sheets

(56) References Cited

U.S. PATENT DOCUMENTS

| | | | | |
|---|---|---|---|---|
| 4,724,976 A * | 2/1988 | Lee | B65D 21/086 | 220/8 |
| 5,575,398 A * | 11/1996 | Robbins, III | A47G 23/0241 | 215/354 |
| 5,579,940 A * | 12/1996 | Weiss | A45C 11/008 | 132/287 |
| 5,715,962 A * | 2/1998 | McDonnell | B65D 21/086 | 220/4.03 |
| 6,135,307 A * | 10/2000 | Fahy | A47G 19/02 | 220/521 |
| 6,276,555 B1 * | 8/2001 | Edwards | A47J 43/24 | 220/23.86 |
| 6,551,284 B1 * | 4/2003 | Greenberg | A61M 25/02 | 604/174 |
| 6,588,616 B1 * | 7/2003 | Ho | B02C 18/0007 | 220/4.03 |
| 6,908,004 B2 * | 6/2005 | Barr | B65D 21/086 | 220/4.03 |
| 7,487,881 B2 * | 2/2009 | Watzke | B65D 1/24 | 220/501 |
| D613,122 S * | 4/2010 | Curtin | A47J 47/10 | D7/629 |
| 8,007,016 B2 * | 8/2011 | Mantyla | B01D 17/0208 | 220/4.03 |
| D651,476 S | 1/2012 | Hauser | | |
| 8,240,503 B2 * | 8/2012 | Curtin | A47J 47/10 | 220/501 |
| 9,119,507 B2 * | 9/2015 | Abrams | A47J 41/0022 | |
| 9,504,340 B2 * | 11/2016 | Starr | A47J 47/00 | |
| 2003/0183628 A1 * | 10/2003 | Barr | B65D 21/086 | 220/8 |
| 2007/0241104 A1 * | 10/2007 | Huizingh | B65D 21/086 | 220/8 |
| 2010/0308042 A1 * | 12/2010 | Faris | B65D 11/02 | 220/8 |
| 2013/0032591 A1 * | 2/2013 | Moran | A45C 7/0036 | 220/8 |
| 2013/0181000 A1 * | 7/2013 | Miksovsky | A45F 3/20 | 220/780 |
| 2015/0136786 A1 * | 5/2015 | Lonner | B65D 45/16 | 220/529 |
| 2015/0251808 A1 * | 9/2015 | Tsui | A45F 3/20 | 220/8 |
| 2015/0251809 A1 * | 9/2015 | Jasin | F41H 3/00 | 220/8 |
| 2016/0045076 A1 * | 2/2016 | de Groote | A47J 47/02 | 220/212 |
| 2016/0059990 A1 * | 3/2016 | Patikas-Bryant | B65D 21/086 | 220/523 |

* cited by examiner

COLLAPSIBLE PRODUCE KEEPER

PRIORITY CLAIM

This application claims the benefit of U.S. provisional application Ser. No. 61/935,745 filed Feb. 4, 2014; the contents of which are incorporated by reference.

FIELD OF THE INVENTION

This invention relates generally to containers for storing produce items.

BACKGROUND OF THE INVENTION

Containers for storing produce items are useful, but such containers are often either too large or too small for the volume of produce to be stored. In the case of containers that are too large, they consume too much space both in a refrigerator when used and in a storage cabinet between uses. Containers or bowls that are collapsible are typically collapsible in a manner that makes them unsuitable for use when in the collapsed position, and as a result the ability to collapse is only an advantage during storage.

SUMMARY OF THE INVENTION

A preferred collapsible produce keeper is selectively positionable between an expanded position and a collapsed position, in which the produce keeper may be used to contain produce in both positions.

The preferred version of the collapsible produce container includes an upper container telescopically connected to a lower container, with a lid removably attached to the upper container and a base removably attached to the lower container.

In one version, the perimeter of the upper container is slightly larger than that of the lower container such that the lower container can fit within the upper container. In a preferred example, each of the upper container and lower container is shaped as a rectangle with rounded corners when viewed from the top.

The lower portion of the upper container may be inclined inward somewhat, and the upper portion of the lower container may be inclined outward somewhat, so that the fit between the two sections is increasingly snug as the two sections move from the collapsed to the expanded position. Most preferably, the inclines cooperate to produce a snug fit in the expanded position that is sufficiently tight to retain the upper container in the expanded position.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
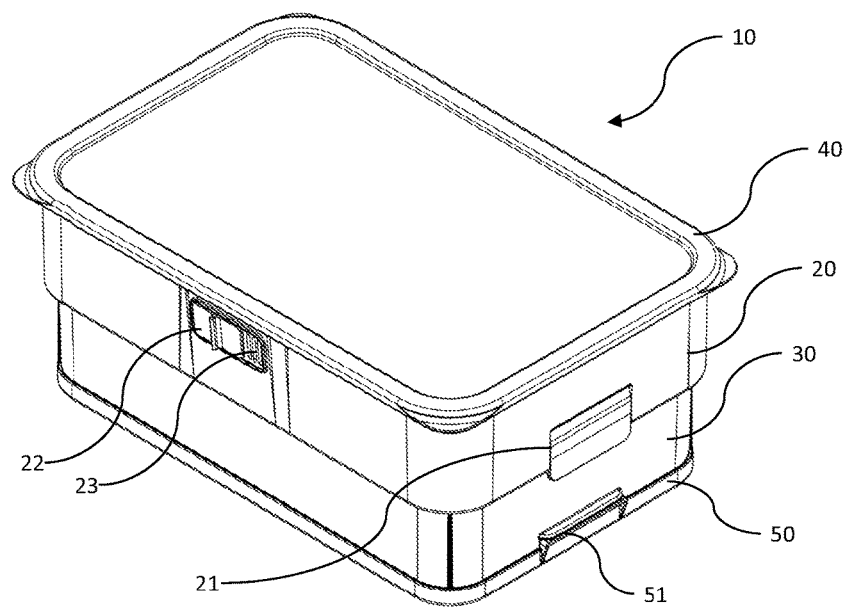
FIG. 1 is a top perspective view of a preferred collapsible produce keeper, shown in an expanded position.
Figure 2:
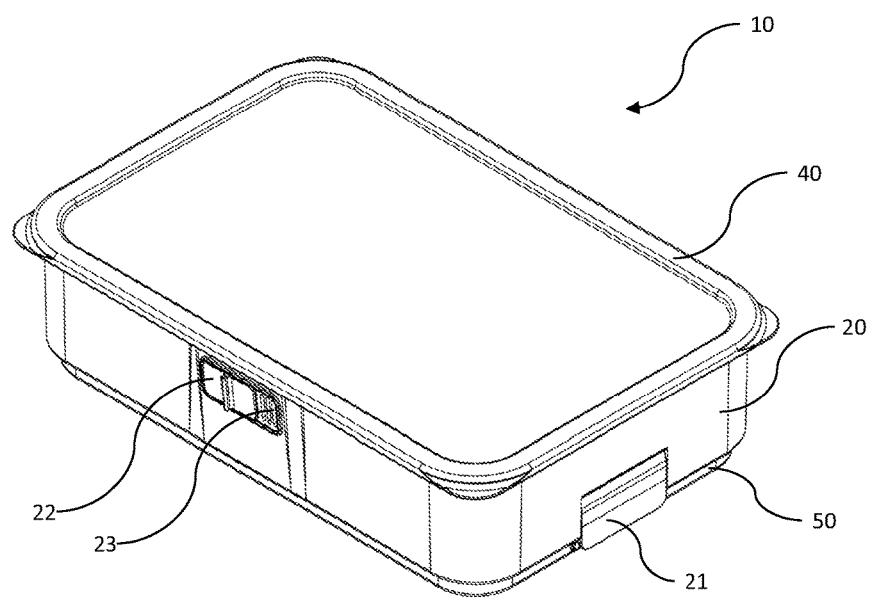
FIG. 2 is a top perspective view of a preferred collapsible produce keeper, shown in a collapsed position.
Figure 3:
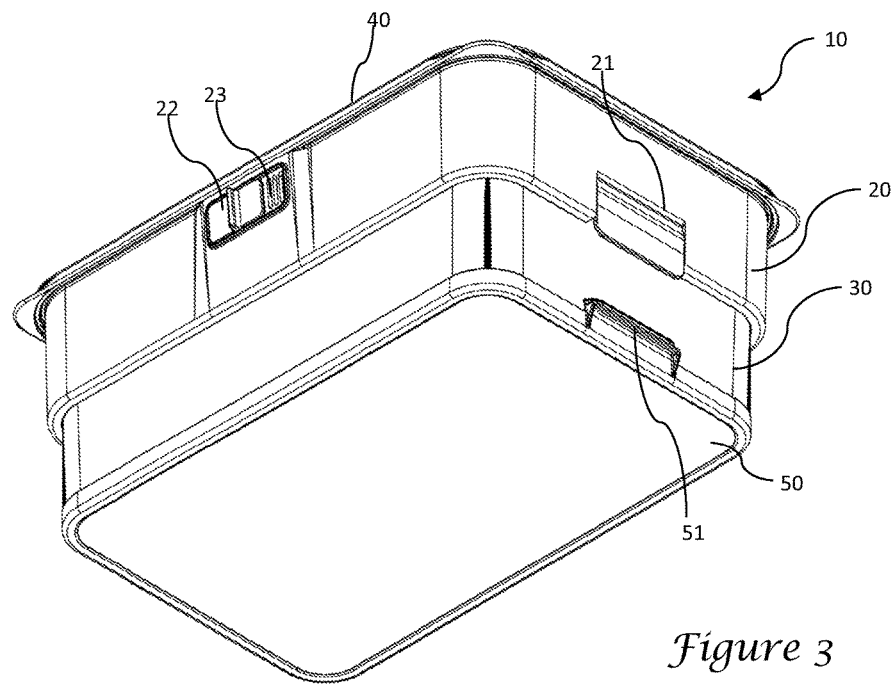
FIG. 3 is a bottom perspective view of a preferred collapsible produce keeper, shown in an expanded position.
Figure 4:
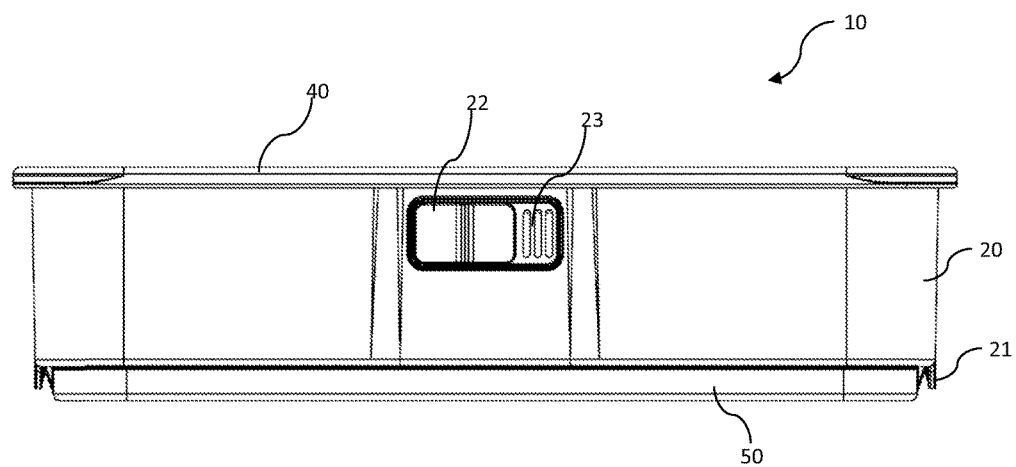
FIG. 4 is a front plan view of a preferred collapsible produce keeper, shown in a collapsed position.
Figure 5:
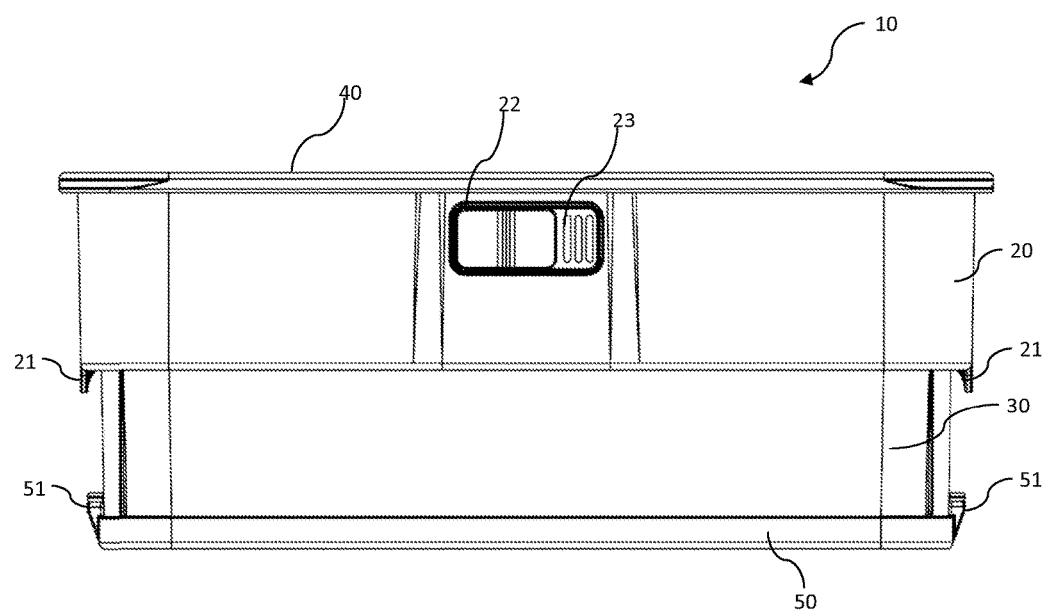
FIG. 5 is a front plan view of a preferred collapsible produce keeper, shown in an expanded position.

With reference to the accompanying figures the present invention is a collapsible produce keeper 10 which is selectively positionable between an expanded position such as shown in FIG. 1 and a collapsed position such as shown in FIG. 2.

The preferred version of the collapsible produce container includes an upper container 20 telescopically connected to a lower container 30, with a lid 40 removably attached to the upper container 20 and a base 50 removably attached to the lower container 30.

In one example of the invention, the upper container 20 and lower container 30 are each constructed from polypropylene or a similar material to produce a generally rigid container. Any materials may be used to form the upper and lower containers, although in accordance with preferred aspects of the invention, the upper and lower containers are each formed from material that is at least semi-rigid or rigid. The lid 40 and base 50 may also be formed from polypropylene, although in other versions of the invention they may be formed from materials that differ from that used for the container.

The upper and lower containers are sized and configured to be telescopic with respect to one another. In the illustrated version, the perimeter of the upper container is slightly larger than that of the lower container such that the lower container can fit within the upper container. As illustrated, each of the upper container and lower container is shaped as a rectangle with rounded corners when viewed from the top, although other shapes are also possible.

Figure 6:
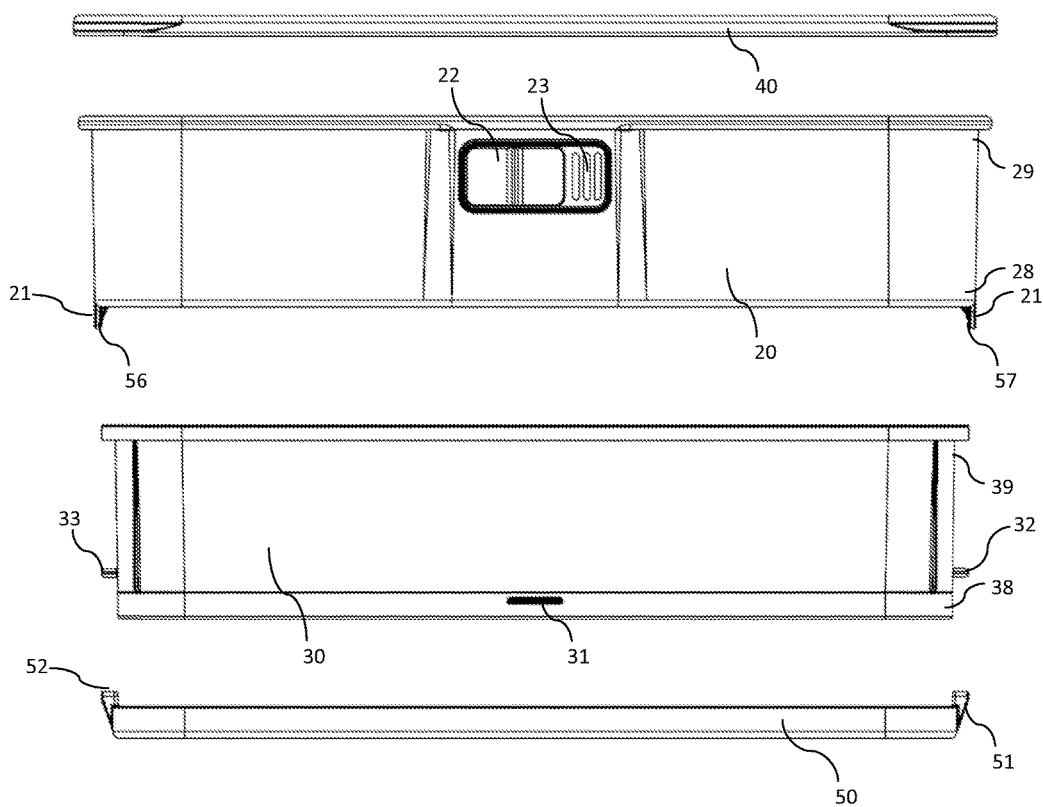
FIG. 6 is a front plan exploded view of a preferred collapsible produce keeper.

As shown in FIG. 6, the sidewalls of the upper container 20 may be inclined inward somewhat (that is, having a larger circumference at the lower portion 28 than the circumference of the upper portion 29), and/or the sidewalls of the lower container may be inclined outward somewhat (that is, having a larger circumference at the upper portion 39 than the lower portion 38), so that the fit between the two sections is increasingly snug as the two sections move from the collapsed to the expanded position. Most preferably, the inclines cooperate to produce a snug fit in the expanded position that is sufficiently tight to retain the upper container in the expanded position as a result of the frictional force.

Figure 7:
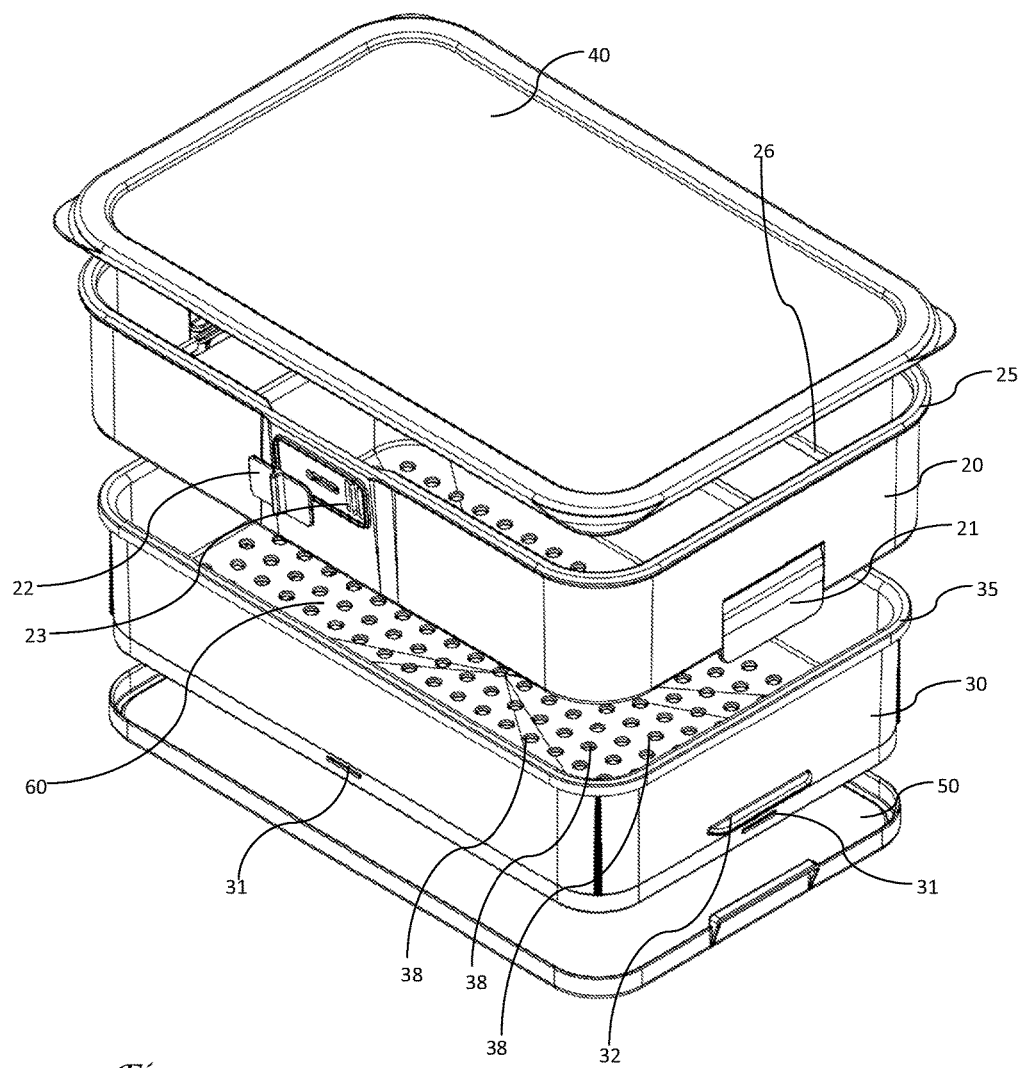
FIG. 7 is a top perspective exploded view of a preferred collapsible produce keeper.
Figure 8:
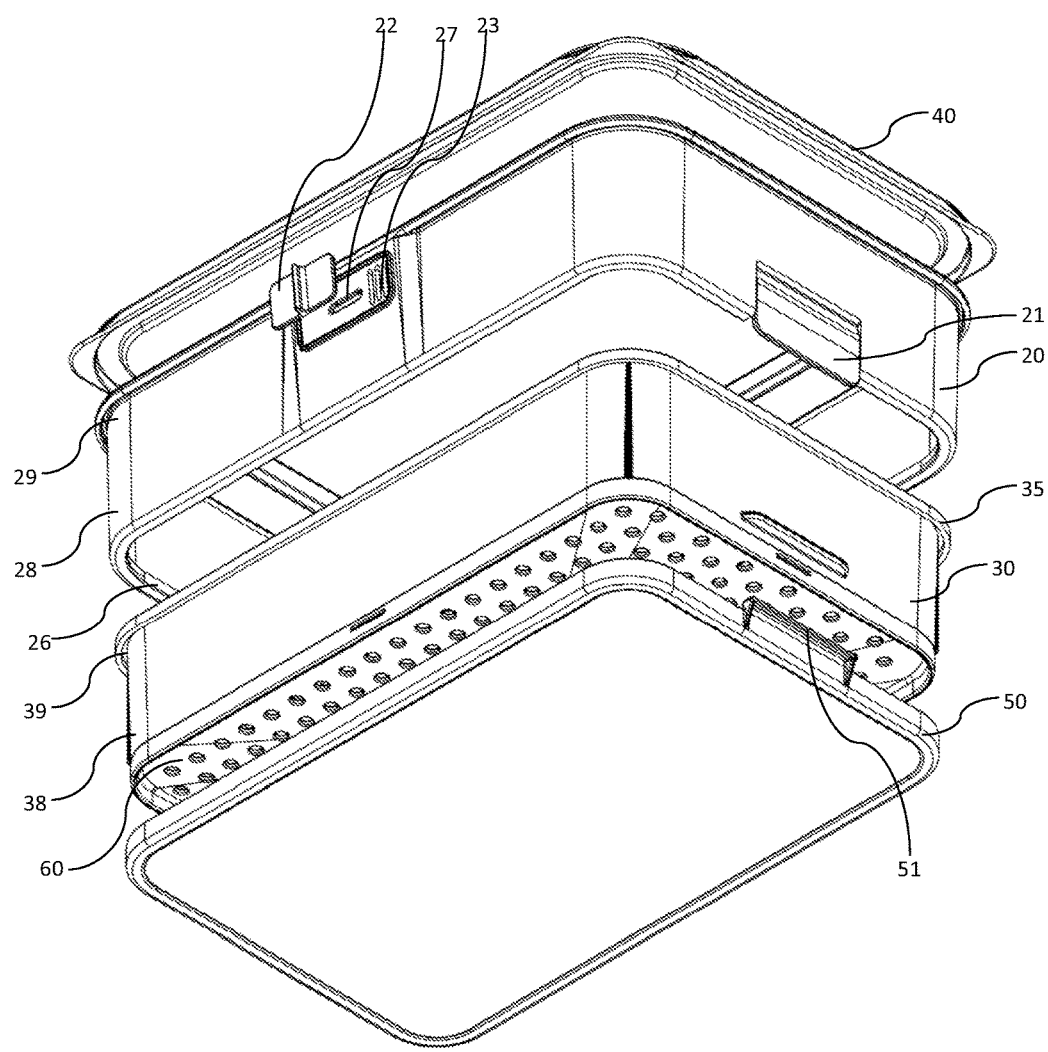
FIG. 8 is a bottom perspective exploded view of a preferred collapsible produce keeper.

The upper container 20 is formed as a continuous vertical sidewall having an open top and an open bottom, as best seen in the exploded views of FIGS. 7 and 8. The lid 40 is removably attachable to the upper container as desired in order to seal the top of the upper container. In the illustrated example, the upper container includes a rim 25 sized and shaped to fit within a peripheral channel formed within the lid 40 to provide a friction fit to secure the lid to the upper container.

The bottom end 28 of the upper container 20 is formed with an inwardly directed flange 26 (see FIG. 8) that extends around all or substantially all of the inner lower perimeter of the upper container. The lower container 30 includes an upper rim 35 having an outwardly directed peripheral flange which is complementary to the inwardly directed flange 26 on the upper container. The flange of the lower container 35 is formed to have a perimeter larger than that of the upper container flange 26. Accordingly, when the lower container is received within the upper container, the upper container is prevented from sliding upward beyond the point at which the two flanges 26, 35 are in contact with one another.

The upper container further includes one or more latches 21, and in the illustrated version a pair of latches is provided, with one on each of two opposing sidewalls, as seen in FIG. 6. The latches may be pivotally attached to the upper container 20 in one version of the invention, or alternatively they may be fixed in position but formed from a material having a degree resiliency allowing the latches to the pulled at least partly outwardly in order to attach and detach the latches.

When the collapsible container is positioned in the collapsed position, each of the latches 21 attaches to a mating surface 51 formed on the base 50. In one example, the latch includes an inwardly facing tab (e.g., 56, 57) which engages and outwardly extending flange (e.g., 32, 33) formed on an outer surface of the sidewalls of the lower container 30. Thus, in one version the latch on the upper container engages the flange on the lower container to hold the collapsible container in the collapsed position.

In another example, the base 50 includes a similar flange (e.g., 51, 52) extending outwardly in a location beneath the latch. The base flange may, in one version of the invention, be positioned on an upwardly extending post which overlaps at least a portion of the outer sidewalls of the lower container 30. The latch may therefore engage the outwardly extending flange formed on the base to maintain the container in the collapsed position, with the upper container positioned adjacent the base.

In the illustrated version, both the lower container 30 and the base 50 include an outwardly directed flange, with each of the outwardly directed flanges being positioned to abut one another when the base is attached to the lower container. In accordance with the illustrated version, the latch formed on the upper container surrounds both the flange formed on the lower container and the flange formed on the base in order to lock the upper container, lower container, and base together.

In yet other versions of the invention, the latching configuration may be varied, for example by reversing the orientation of the latches and the flanges on the various components. Likewise, while two latches are shown in the illustrated version of the invention, a different number of latches such as more than two may be used in other versions of the invention.

The base 50 may attach to the lower container 30 in a manner similar to the connection between the lid and the upper container, such as by forming a mating tongue and groove arrangement. In the illustrated version, the base includes a short peripheral upwardly extending sidewall sized and configured to snugly receive the bottom of the lower container. Most preferably, the fit between the base and the lower container is snug enough to form a watertight or substantially watertight seal. In other versions, the enclosure need not be watertight, particularly where the upwardly directed sidewall from the base is tall enough to retain the volume of water expected to pool within the base.

The lower container 30 is formed with vertical sidewalls in a manner similar to that of the upper container 20, and likewise the lower container includes an open top. Thus, in one version both the lower container 30 and the upper container 20 are formed with sidewalls defining an outer perimeter but with an open top and an open bottom.

In one version, the lower container further includes a floor 60 which is preferably someone concave at the center such that the floor 60 is highest where it meets the sidewalls of the container 30 and lowest at a location in the interior. In addition, the floor includes a plurality of through-holes 38 allowing air and water to travel through the floor. The concave shape and holes direct any water that may gather on the floor in a downward direction and through the holes.

The base 50 and the lower container 30 may include one or more complementary locking features 31 such as a shallow tab and slot, tongue and groove, or similar feature. In one example, each of these structures is relatively shallow to provide resistance against separation of the base from the lower container, while at the same time allowing the two components to be separated under a prying force from the user.

A primary intended purpose for the collapsible produce keeper is for the storage of perishable vegetables such as lettuce, herbs, and the like. Consequently, the floor 60 is preferably raised above the lower edge of the lower portion 38 of the sidewalls of the lower container 30, thereby providing a space between the floor and the upper surface of the base 50. The space between the floor and the base, together with the plurality of holes formed in the floor, allow for air circulation around and under the food items stored in the container. In addition, it allows for water to drain from the food items downward toward the floor where the water can travel through the floor and pool in the base, rather than in the floor, in the location where the water does not remain in contact with the food items.

In the illustrated version, the upper container further includes a vent formed with one or more holes 23 and a vent cover 22. Most preferably, the ventilation holes are positioned along an upper end of the upper container 20 in order to allow for air travel in or out of the container. In one example of the invention, the vent cover includes an inward-facing tab that is trained within a slot 27 within the upper container 20 (see FIG. 8), and therefore is attached to the upper container in a manner allowing the vent cover to slide laterally between an open position in which the ventilation holes 23 are exposed to allow air circulation, and a closed position in which the ventilation holes are blocked by the vent cover.

Figure 9:
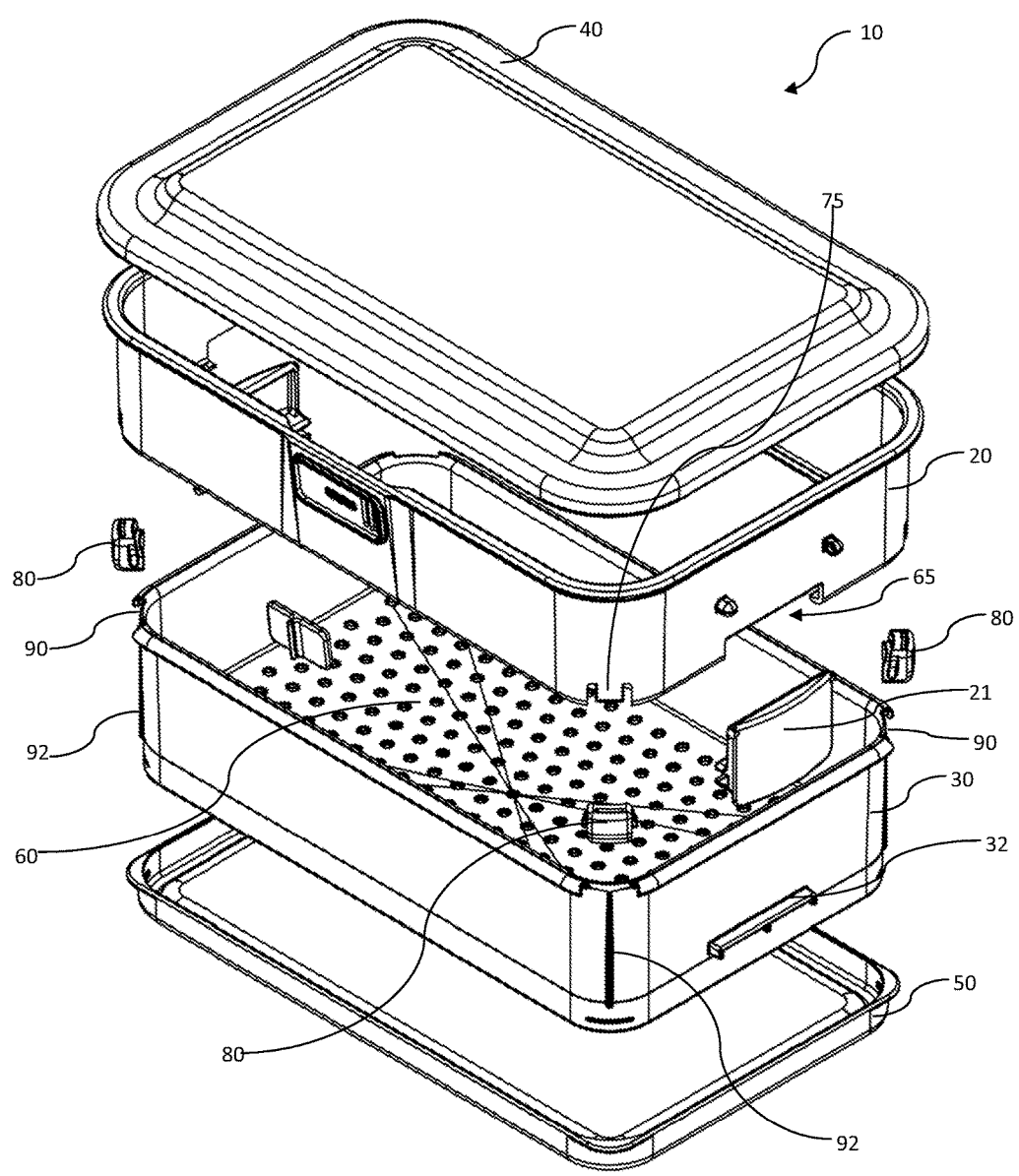
FIG. 9 is a top perspective exploded view of an alternate version of a preferred collapsible produce keeper.
Figure 10:
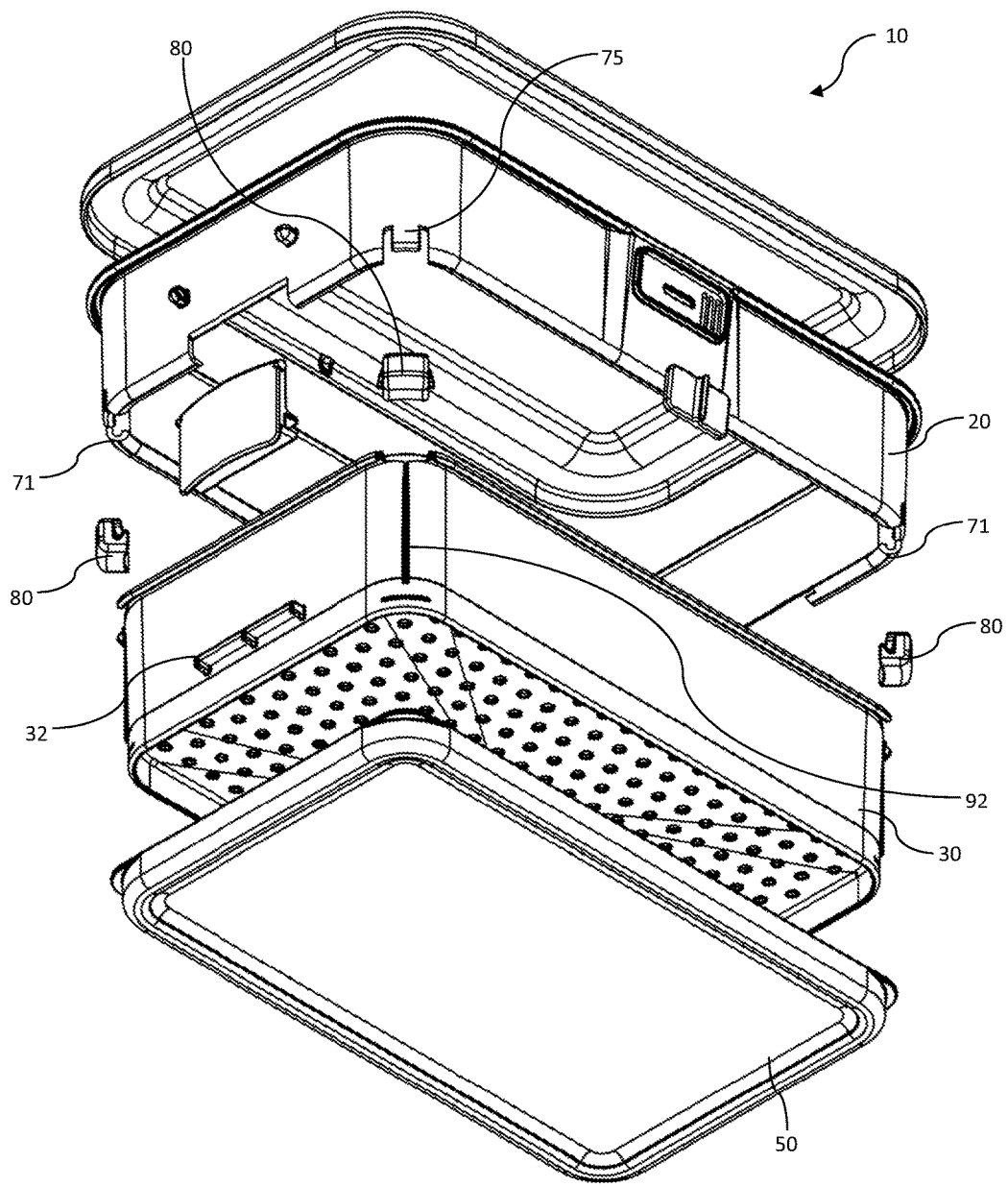
FIG. 10 is a bottom perspective exploded view of an alternate version of a preferred collapsible produce keeper

FIGS. 9 and 10 illustrate an alternate view of a preferred produce keeper. The alternate version includes an upper container 20 and a lower container 30, with a floor 50 and a lid 40. As illustrated, the floor 60 is bowed downwardly so that it is lower at the center than at the location where the floor meets the sidewalls of the lower container.

Figure 11:
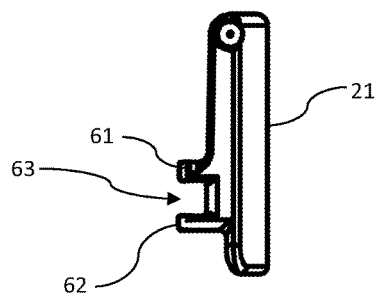
FIG. 11 is a front plan view of a preferred latch for use with a collapsible produce keeper.

A latch 21 for use in the alternate version is illustrated in FIGS. 9 and 10, and also in a front view in FIG. 11. The latch attaches to the upper container for pivotal movement to lock and unlock the two container portions together in a collapsed position. The latch includes a pair of inward-facing tabs 61, 62 extending inward toward the container and forming a channel 63 between them. The flange 32 formed on the lower container is snugly received within the channel to hold the latch to the flange. Likewise, the connection holds the upper container in position collapsed down to the lower container. A cutout 65 is formed at a bottom portion of the sidewall of the upper container to receive the pair of tabs 61, 62 when the latch is unlocked and the upper container is in the expanded position.

Figures 12, 13:
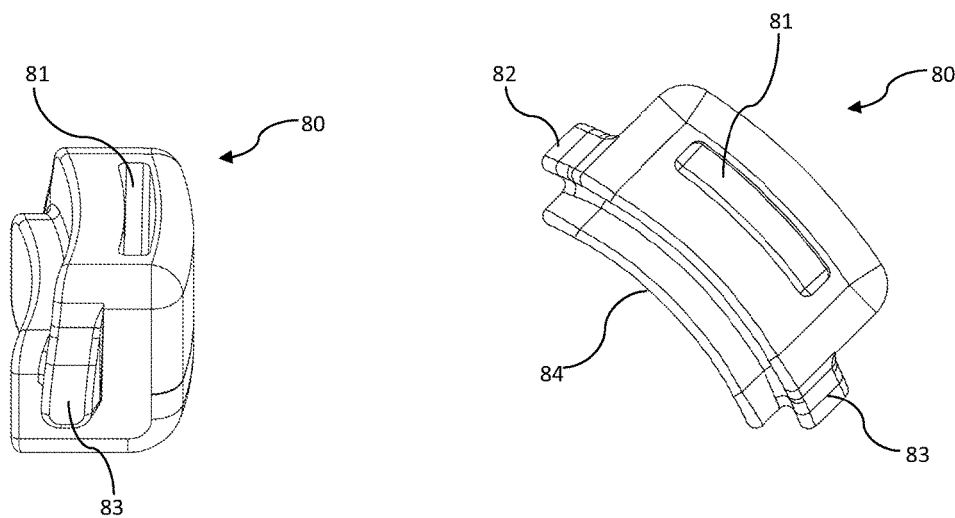
FIG. 12 is a top perspective view of a preferred foot for use with a collapsible produce keeper.
FIG. 13 is a top plan view of a preferred foot for use with a collapsible produce keeper.

In one version of the invention, a resilient foot 80 is positioned at the bottom of each corner of the upper container 20. Thus, as illustrated, four feet 80 are provided. The feet are best seen in FIGS. 9 and 10, and separately shown in FIGS. 12 and 13. In one version, the foot 80 is formed with an arcuate inner face 84 that, when mounted, is directed toward the interior of the upper container 20. Each side of the inner face 84 includes a wing 82, 83 extending laterally away from the inner face. Most preferably, the inner face is not in the same plane as the wings 82, 83, so that it is positioned farther toward the interior of the upper container 20 when attached to the container. A top surface of the foot includes a cavity 81 configured to receive a tab as described below.

At each of the bottom corners of the upper container 20, a tab 75 is positioned adjacent a pair of slots. The tab 75 is sized to be received within the cavity 81 to secure the foot to the tab. The lower sidewalls of the upper container further terminate in an in-turned channel 71 adjacent the tab, with a channel portion extending on either side of the tab. The channel 71 is sized to receive a corresponding one of the wings 82, 83, so that the combination of the wings within the channel and the tab within the cavity will hold the foot in place at the lower corner of the upper container.

The lower container preferably includes a vertical rib 92 positioned at each of the four corners. The rib 92 is positioned so that the arcuate inner face of the foot rides against the rib to aid in frictionally holding the upper container in a particular vertical position with respect to the lower container. The foot is preferably formed from a resilient material, and in one version it is formed from silicone. The resilient nature of the foot improves the frictional engagement of the foot against the rib and outer sidewall of the lower container, which is preferably formed from a rigid plastic material.

In use, a desired amount of food items such as lettuce or herbs is placed within the container, which may be either in the collapsed or expanded position as necessary depending on the volume of food items placed in the container. The base and lid are each positioned on the container to enclose the container, with the vent cover positioned as desired to allow for air circulation.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A collapsible produce keeper, comprising:
   a lower container having a floor surrounded by upwardly extending sidewalls terminating in an open rim;
   a base removably attached to the lower container to enclose a bottom portion of the lower container sidewalls, the floor being positioned between the base and the open rim, the floor further having at least one opening to provide a fluid passageway between the floor and the base;
   an upper container having upwardly extending sidewalls, an open top, and an open bottom;
   a lid removably attached to the upper container to enclose an upper portion of the upper container;
   the upper container, lower container, base, and lid defining an interior volume, the upper container being movable with respect to the lower container between a collapsed position in which the upper container is relatively closer to the base and an expanded position in which the upper container is relatively distant from the base, the interior volume being larger in the expanded position than in the collapsed position;
   a plurality of elastomeric feet attached to the open bottom of the upper container, the plurality of elastomeric feet frictionally engaging the lower container when the upper container moves from the collapsed position to the expanded position and remaining in engagement with the lower container when the upper container is in the expanded position; and
   a plurality of ribs positioned on the lower container and extending along the upwardly extending sidewalls from a position adjacent the floor to a position adjacent the open rim, wherein each one of the plurality of elastomeric feet engage a separate one of the plurality of ribs when the upper container moves from the collapsed position to the expanded position.

2. The collapsible produce keeper of claim 1, wherein the upper container surrounds the lower container.

3. The collapsible produce keeper of claim 2, further comprising a latch attached to the upper container, the latch being configured to secure the upper container in the collapsed position.

4. The collapsible produce keeper of claim 3, further comprising a flange carried on the base, the latch being configured to receive the flange to secure the upper container in the collapsed position.

5. The collapsible produce keeper of claim 3, further comprising a flange carried on the lower container, the latch being configured to receive the flange to secure the upper container in the collapsed position.

6. The collapsible produce keeper of claim 5, further comprising a cutout formed in the upper container, a portion of the flange being received within the cutout in the collapsed position.

7. The collapsible produce keeper of claim 3, further comprising a configurable vent positioned on the upper container, the vent being selectively movable between an open position to allow air to pass into the upper container, and a closed position to block the passage of air into the upper container.

8. The collapsible produce keeper of claim 1, wherein the bottom of the upper container comprises a plurality of tabs and each of the plurality of feet comprises a slot, the plurality of tabs being positioned within the plurality of slots to mount the plurality of feet to the bottom of the upper container.

9. The collapsible produce keeper of claim 1, wherein each of the plurality of feet comprises a pair of laterally extending wings and an arcuate inner face positioned between the pair of wings, and further wherein the bottom of the upper container comprises an in-turned channel, the wings being carried in the in-turned channel, the arcuate inner face being positioned to abut an outer surface of the lower container.

10. A collapsible produce keeper, comprising:
    a lower container having a perforated floor surrounded by upwardly extending sidewalls terminating in an open rim, the lower container further having a pair of flanges positioned on opposing lower outer surfaces of the upwardly extending sidewalls;

a base removably attached to the lower container to enclose a bottom portion of the lower container sidewalls, the perforated floor being positioned between the base and the upper rim, whereby fluid may pass through the perforated floor to the base;

an upper container having upwardly extending sidewalls, an open top, and an open bottom, the upper container surrounding the lower container and being positioned for axial movement with respect to the lower container;

the upper container further having a pair of cutouts positioned on opposing lower outer surfaces of the upwardly extending sidewalls of the upper container;

the upper container further having a pair of latches, each one of the pair of latches being positioned on the outer surfaces of the upwardly extending sidewalls of the upper container and adjacent a corresponding one of the pair of cutouts;

a lid removably attached to the open top of the upper container;

the upper container, lower container, base, and lid defining an interior volume, the upper container being movable with respect to the lower container between a collapsed position in which the upper container is relatively closer to the base and an expanded position in which the upper container is relatively distant from the base, the interior volume being larger in the expanded position than in the collapsed position;

wherein in the collapsed position the pair of flanges are received in the pair of cutouts and the pair of latches engages the pair of flanges to retain the upper container in the collapsed position.

11. The collapsible produce keeper of claim 10, wherein the perforated floor is bowed downward toward the base at a central location of the perforated floor.

12. The collapsible produce keeper of claim 10, further comprising a resilient member formed from an elastomeric material and being positioned between the upper container and the lower container to frictionally hold the upper container in a plurality of positions between the expanded position and the collapsed position.

13. The collapsible produce keeper of claim 10, further comprising at least one foot attached to the upper container, the at least one foot being configured to engage the lower container to hold the upper container in the expanded position.

14. The collapsible produce keeper of claim 13, wherein the bottom of the upper container comprises a tab and the at least one foot comprises a slot, the tab being positioned within the slot to mount the foot to the bottom of the upper container.

15. The collapsible produce keeper of claim 14, wherein the lower container further comprises a rib, the at least one foot engaging the rib as the upper container moves between the expanded position and the collapsed position.

* * * * *